US012698552B2

(12) United States Patent
Kang et al.

(10) Patent No.: US 12,698,552 B2
(45) Date of Patent: Aug. 4, 2026

(54) GALVANIZED STEEL SHEET WITH EXCELLENT SURFACE QUALITY AND ELECTRICAL RESISTANCE SPOT WELDABILITY AND METHOD FOR MANUFACTURING SAME

(71) Applicant: POSCO Co., Ltd, Pohang-si (KR)

(72) Inventors: Ki-Cheol Kang, Gwangyang-si (KR);
Yong-Joo Kim, Gwangyang-si (KR);
Tae-Chul Kim, Gwangyang-si (KR);
Myung-Soo Kim, Gwangyang-si (KR);
Jong-Sang Kim, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 162 days.

(21) Appl. No.: 18/266,483

(22) PCT Filed: Dec. 21, 2021

(86) PCT No.: PCT/KR2021/019451
§ 371 (c)(1),
(2) Date: Jun. 9, 2023

(87) PCT Pub. No.: WO2022/139390
PCT Pub. Date: Jun. 30, 2022

(65) Prior Publication Data
US 2024/0026488 A1     Jan. 25, 2024

(30) Foreign Application Priority Data
Dec. 21, 2020     (KR) ........................ 10-2020-0179215

(51) Int. Cl.
*C21D 1/74*      (2006.01)
*B32B 15/01*     (2006.01)
(Continued)

(52) U.S. Cl.
CPC ............ *C23C 2/024* (2022.08); *B32B 15/013* (2013.01); *C21D 1/74* (2013.01); *C21D 6/002* (2013.01);
(Continued)

(58) Field of Classification Search
CPC ....... C22C 38/02; C22C 38/04; B15B 15/013; C21D 1/74; C21D 7/02; C21D 8/0226; C21D 8/0236; C21D 8/0273
See application file for complete search history.

(56) References Cited

U.S. PATENT DOCUMENTS

4,383,006 A * 5/1983 Shindo ...................... C23C 2/06
                                                                 420/514
2014/0234658 A1   8/2014 Nozaki et al.
(Continued)

FOREIGN PATENT DOCUMENTS

CN        108431273 A     8/2018
EP         4079921 A1     10/2022
(Continued)

OTHER PUBLICATIONS

KR101726090 English Language Translation form EPO espacenet obtained Jun. 10, 2025. (Year: 2025).*
(Continued)

*Primary Examiner* — Adam Krupicka
(74) *Attorney, Agent, or Firm* — Morgan Lewis & Bockius LLP

(57)     ABSTRACT

The present invention relates to a high-strength hot-dipped galvanized steel sheet having excellent surface quality and spot weldability and a method for manufacturing same. The hot-dipped galvanized steel sheet according to one aspect of the present invention comprises a base steel sheet and a hot-dipped galvanized layer formed on the surface of the base steel sheet, in which an inhibiting layer made of an
(Continued)

Fe—Al alloy can be formed at an area ratio of 60% or more between the base steel sheet and the hot-dipped galvanized layer.

5 Claims, 1 Drawing Sheet

(51) Int. Cl.

| | |
|---|---|
| *C21D 6/00* | (2006.01) |
| *C21D 8/02* | (2006.01) |
| *C21D 8/0221* | (2026.01) |
| *C21D 8/0247* | (2026.01) |
| *C21D 8/0278* | (2026.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C22C 38/22* | (2006.01) |
| *C22C 38/26* | (2006.01) |
| *C22C 38/28* | (2006.01) |
| *C22C 38/32* | (2006.01) |
| *C22C 38/34* | (2006.01) |
| *C22C 38/38* | (2006.01) |
| *C22C 38/60* | (2006.01) |
| *C23C 2/02* | (2006.01) |
| *C23C 2/40* | (2006.01) |

(52) U.S. Cl.
CPC ............. *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0273* (2013.01); *C21D 8/0278* (2013.01); *C21D 9/46* (2013.01); *C22C 38/002* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/22* (2013.01); *C22C 38/26* (2013.01); *C22C 38/28* (2013.01); *C22C 38/32* (2013.01); *C22C 38/34* (2013.01); *C22C 38/38* (2013.01); *C22C 38/60* (2013.01); *C23C 2/02* (2013.01);

*C23C 2/0222* (2022.08); *C23C 2/0224* (2022.08); *C23C 2/40* (2013.01)

(56) References Cited

U.S. PATENT DOCUMENTS

| | | |
|---|---|---|
| 2014/0349133 A1 | 11/2014 | Lee et al. |
| 2018/0002797 A1 | 1/2018 | Oh et al. |
| 2018/0371570 A1 | 12/2018 | Kim et al. |
| 2020/0157649 A1 | 5/2020 | Lee et al. |
| 2020/0340086 A1 | 10/2020 | Han et al. |
| 2022/0010420 A1 | 1/2022 | Han et al. |
| 2022/0042155 A1 | 2/2022 | Kang et al. |
| 2022/0056564 A1 | 2/2022 | Kang et al. |
| 2022/0127704 A1 | 4/2022 | So et al. |

FOREIGN PATENT DOCUMENTS

| | | |
|---|---|---|
| EP | 4265809 A1 | 10/2023 |
| JP | 2020-528495 A | 9/2020 |
| KR | 10-2013-0073421 A | 7/2013 |
| KR | 10-2015-0073315 A | 7/2015 |
| KR | 10-2016-0077538 A | 7/2016 |
| KR | 10-1726090 B1 | 4/2017 |
| KR | 10-2019-0073200 A | 6/2019 |
| KR | 10-2019-0075589 A | 7/2019 |
| KR | 10-2020-0063983 A | 6/2020 |
| KR | 10-2020-0076796 A | 6/2020 |
| WO | 2013/047836 A1 | 4/2013 |
| WO | 2019/124807 A1 | 6/2019 |
| WO | 2020/111874 A2 | 6/2020 |
| WO | 2020/130602 A2 | 6/2020 |
| WO | 2020/130631 A1 | 6/2020 |

OTHER PUBLICATIONS

European Search Report dated Jun. 17, 2024 issued in European Patent Application No. 21911457.6.

International Search Report dated Apr. 27, 2022, issued in International Patent Application No. PCT/KR2021/019451 (with English translation).

Decision of Rejection dated Jul. 15, 2025 issued in the corresponding Japanese Patent Application No. 2023-537355 with the English translation.

Office Action issued in corresponding Chinese Patent Application No. 202180087037.0 dated Feb. 28, 2026, with English translation.

Indian Office Action dated Apr. 17, 2026 issued in Indian Patent Application No. 202317043450 (with English translation).

* cited by examiner

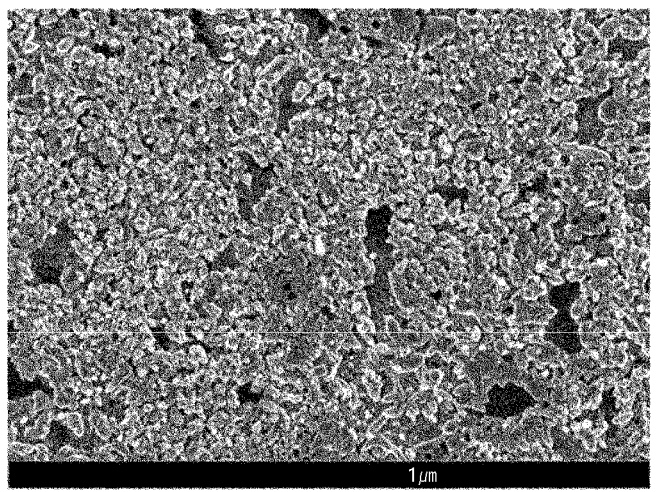

GALVANIZED STEEL SHEET WITH EXCELLENT SURFACE QUALITY AND ELECTRICAL RESISTANCE SPOT WELDABILITY AND METHOD FOR MANUFACTURING SAME

CROSS-REFERENCE OF RELATED APPLICATIONS

This application is the U.S. National Phase under 35 U.S.C. § 371 of International Patent Application No. PCT/KR2021/019451, filed on Dec. 21, 2021, which in turn claims the benefit of Korean Application No. 10-2020-179215, filed on Dec. 21, 2020, the disclosures of which applications are incorporated by reference herein.

TECHNICAL FIELD

The present disclosure relates to a high-strength hot-dipped galvanized steel sheet having excellent surface quality and spot weldability and a method for manufacturing same.

BACKGROUND ART

Due to problems such as environmental pollution, regulations on automobile exhaust gas and fuel efficiency are being strengthened day by day. As a result, demand for reducing fuel consumption through weight reduction of automobile steel sheets is increasing, and thus, various types of high-strength steel sheets having high strength per unit thickness are being developed and released.

High-strength steel usually means steel having strength of 490 MPa or more, but is not necessarily limited thereto, and may include transformation induced plasticity (TRIP) steel, twin induced plasticity (TWIP) steel, dual phase (DP) steel, complex phase (CP) steel, etc.

Meanwhile, automotive steel is supplied in the form of a steel sheet whose surface is plated to secure corrosion resistance. Thereamong, galvanized steel sheet (GI), highly corrosion-resistant plated steel sheet (ZM) or alloyed galvanized steel sheet (GA) are widely used as automobile materials because they have high corrosion resistance by using sacrificial anti-corrosive properties of zinc.

However, when the surface of the high-strength steel sheet is plated with zinc, there may be a problem in that spot weldability may be weak. That is, since the high-strength steel has high tensile strength and yield strength, the high-strength steel is highly likely to generate microcracks on the surface because it is difficult to relieve tensile stress generated during welding through plastic deformation. When welding is performed on a high-strength galvanized steel sheet, zinc with a low melting point penetrates into the microcracks in the steel sheet to cause a phenomenon known as liquid metal embrittlement (LME), resulting in a problem in that the steel sheet is destroyed in a fatigue environment. This may act as a major obstacle to increasing the strength of the steel sheet.

DISCLOSURE

Technical Problem

The present disclosure provides a high-strength hot-dipped galvanized steel sheet with excellent surface quality and spot weldability and a method for manufacturing the same.

The subject of the present disclosure is not limited to the above. Those skilled in the art to which the present disclosure pertains will have no difficulty in understanding the additional objects of the present disclosure from the contents throughout the present specification.

Technical Solution

In an aspect in the present disclosure, a hot-dipped galvanized steel sheet includes a base steel sheet, and a hot-dipped galvanized layer formed on a surface of the base steel sheet, in which an inhibiting layer made of a Fe—Al alloy may be formed at an area ratio of 60% or more between the base steel sheet and the hot-dipped galvanized layer.

In another aspect in the present disclosure, a method for manufacturing a hot-dipped galvanized steel sheet may include providing a steel slab, reheating the slab to a temperature of 950 to 1300° C., obtaining a steel sheet by hot rolling the reheated slab to a finishing rolling start temperature of 900 to 1,150° C. and a finishing rolling end temperature of 850 to 1,050° C., winding the steel sheet in a temperature range of 590 to 750° C., pickling the steel sheet at a rolling speed of 180 to 250 mpm, cold rolling the steel sheet at a reduction rate of 35 to 60%, recrystallization annealing the cold-rolled steel sheet by heating the cold-rolled steel sheet under moist nitrogen conditions having a soaking zone temperature and a dew point temperature of 650 to 900° C. and −10 to +30° C., respectively, and containing 5 to 10 vol % of $H_2$ as an atmospheric gas; and hot-dip plating the steel sheet by dipping the steel sheet in a hot-dip galvanizing bath at a inlet temperature of 420 to 500° C.

Advantageous Effects

As set forth above, according to the present disclosure, by forming an inhibiting layer in a uniform and wide area between a hot-dipped galvanized layer and a base steel sheet, it is possible to inhibit a penetration of a molten plating layer into microcracks during welding without any additional means, thereby improving weldability.

BRIEF DESCRIPTION OF THE DRAWINGS

FIG. 1 is an electron micrograph of a surface of an inhibiting layer of a hot-dipped galvanized steel sheet obtained in an implement example of the present disclosure.

BEST MODE

Terminologies used herein are to mention only a specific exemplary embodiment, and are not to limit the present disclosure. Singular forms used herein include plural forms as long as phrases do not clearly indicate an opposite meaning.

A term "including" used in the present specification concretely indicates specific properties, regions, integer numbers, steps, operations, elements, and/or components, and is not to exclude presence or addition of other specific properties, regions, integer numbers, steps, operations, elements, components, and/or a group thereof.

All terms including technical terms and scientific terms used herein have the same meaning as the meaning generally understood by those skilled in the art to which the present disclosure pertains unless defined otherwise. Terms defined in commonly used dictionaries are additionally interpreted as having meanings consistent with related technical literature and currently disclosed content, and are not interpreted in ideal or very formal meanings unless defined.

Hereinafter, a high-strength hot-dipped galvanized steel sheet having excellent plating quality according to an aspect of the present disclosure completed through the research of the present inventor will be described in detail. It should be noted that in the present disclosure, when each element is expressed as content, the content means wt % unless otherwise specified. In addition, a ratio of crystal or structure is based on area unless otherwise specified, and the content of gas is based on volume unless otherwise specified.

The inventors of the present disclosure have led to the invention of the present disclosure by focusing on the fact that liquid metal embrittlement (LME), which occurs during welding, occurs when the molten plating layer penetrates into the microcrack of the base steel sheet to discover that, even if microcracks exist in a base steel sheet, a plating solution blocks the opportunity to contact the base steel sheet in a molten state or even if the plating solution is blocked, the liquid metal embrittlement may be significantly inhibited when the penetration into the inside of the microcracks is hindered.

That is, one aspect of the present disclosure is to inhibit liquid metal embrittlement by controlling the shape and distribution of a Fe—Al interfacial alloy layer (also referred to as an inhibiting layer) formed in a high-strength hot-dipped galvanized steel sheet. The Fe—Al interfacial alloy layer has a higher melting point than the hot-dipped galvanized layer, and when the hot-dipped galvanized steel sheet is heated by welding, the plating layer is additionally alloyed and thus the melting point and viscosity of the plating layer increase, thereby blocking the plating solution from being in contact with the base steel sheet in the molten state or inhibiting the plating solution from penetrating into microcracks due to remarkably reduced fluidity (high viscosity) even if the contact is made.

In general, during hot-dip galvanizing, a certain degree of inhibiting layer (IL) may be formed due to a diffusion reaction occurring between a heated base steel sheet and a hot-dip galvanizing bath. However, due to the high Mn and/or Si content required for high-strength steel, diffusion may be difficult to occur on the surface, and it is not easy to evenly form the inhibiting layer over the entire interface due to the characteristics of the inhibiting layer formed.

In view of this point, the inventors of the present disclosure tried to inhibit the occurrence of liquid metal embrittlement as much as possible during welding by appropriately controlling the shape of the inhibiting layer between the hot-dipped galvanized layer and the base steel sheet as illustrated in FIG. 1, and limiting the distribution of the portion where the inhibiting layer is not formed. Preferred inhibiting layer conditions of the present disclosure will be described in detail below.

Inhibiting Layer Ratio: 60 Area % or More

When an inhibiting layer is formed with an area fraction of less than 60%, it becomes difficult to prevent the molten plating layer from being in contact with the base steel sheet. Therefore, in one implementation example of the present disclosure, the ratio of the inhibiting layer needs to be limited to 60% or more. In addition, in order to increase the effect of inhibiting the occurrence of liquid metal embrittlement due to such an inhibiting layer, in one implementation example of the present disclosure, the ratio of the inhibiting layer may be 70% or more, and in another implementation example of the present disclosure, the ratio of the inhibiting layer may be 80% or more. Since the larger the ratio of the inhibiting layer, the more advantageous it is, the upper limit of the ratio is not particularly limited. However, considering the form of the inhibiting layer described later, the upper limit of the ratio of the inhibiting layer may be set to 95% or 90%.

Type of Inhibiting Layer

In the present disclosure, the inhibiting layer may not simply be distributed over a large area, but may have a particle shape as illustrated in FIG. 1. In this case, it may be difficult to limit the size of the particle or the like because it may be difficult to see that the particles are completely separated from each other. However, when a straight line is drawn in one direction in the drawing, a length of a line segment overlapping the particle may be determined as a width of the particles. In the present disclosure, the average value of the widths of such particles is limited to 4 μm or less. By forming fine particles in this way, it is possible to prevent the molten plating layer from being in contact with the base steel sheet because the particles are densely connected even at the same area fraction of the inhibiting layer. In particular, such particles may be formed not only in a single layer, but also in multiple layers. In this case, the smaller the average width of the particles, the more the molten plating layer should flow toward the base steel sheet through a narrow and complicated path, so it may make the contact of the molten plating layer and the base steel sheet difficult. Since the smaller the average value of the widths of the particles, the more advantageous it is, the lower limit is not necessarily set, but as confirmed by the present inventors, the average value may be approximately 0.5 μm. In another implementation example of the present disclosure, the lower limit of the average width of the particles may be 1.0 μm. When the size of the particles is smaller than the lower limit, the interface roughness between the alloying inhibiting layer and the plating layer is low, and sufficient mechanical bonding force is not generated, so peeling may occur.

Shape of Portion where Inhibiting Layer is not Formed

Since the inhibiting layer does not completely cover the surface of the base steel sheet, there may be a portion where the inhibiting layer is not formed. However, even if an occupancy rate of the portion where the inhibiting layer is not formed is the same, an aspect of a liquid metal embrittlement phenomenon may vary depending on a dispersion type. That is, when the unformed portion of the inhibiting layer is finely dispersed, it may be difficult for the molten plating layer to flow into a base steel sheet due to the surrounding inhibiting layer, but when a small number of portions where the inhibiting layer is not formed are formed in a large size, it is difficult to block the inflow of the molten plating layer. Therefore, in one implementation example of the present disclosure, an average equivalent circle diameter of the portion (the unformed portion of the inhibiting layer) where the inhibiting layer is not formed is limited to 15 μm or less. Since the inflow of molten metal may be effectively blocked by limiting the average size of the unformed portion of the inhibiting layer, in another implementation example of the present disclosure, the average size (equivalent circle diameter) of the unformed portion of the inhibiting layer may be limited to 10 μm or less. In another implementation example, the average equivalent circle diameter of the unformed portion of the inhibiting layer may be limited to 7 μm or less. In addition, since it is difficult to completely limit the formation of the large unformed portion only by limiting the average size of the unformed portion of the inhibiting layer, in one implementation example of the present disclosure, an unformed portion of an inhibiting layer having an equivalent circle diameter of 20 μm or more may be limited to one or less, in another implementation example, an unformed portion of an inhibiting layer having an equivalent circle diameter of 15 μm or more may be limited to one or less, and in another implementation example, the number of unformed portions of an inhibiting layer having an equivalent circle diameter of 10 μm or more may be limited to two or less. When there are a large number of unformed portions of the inhibiting layer, the mechanical bonding strength between the inhibiting layer and the galvanized layer is not sufficient, so plating peeling may occur, and a possible contact area of liquid zinc with the base iron increases, so liquid embrittlement cracks may develop.

In the present disclosure, the inhibiting layer is analyzed in the following manner. First, the surface of the hot-dipped galvanized steel sheet is dissolved with a dichromic acid solution ($CrO_3$+$HNO_3$+$ZnSO_4$+$H_2O$) to dissolve the non-alloyed plating layer (usually made of Zn on eta, but not necessarily limited thereto), and the obtained surface may be neutralized and washed to be cleaned, so only the inhibiting layer may be exposed on the surface. Thereafter, in order to analyze the occupancy ratio (area ratio) of the inhibiting layer, in the photograph of the Al distribution at a magnification of 500 times using EPMA, an area with a concentration (CPS) of 10% or more of the maximum concentration of Al (value measured by CPS) may be considered an area where an Al inhibiting layer exists, and the area ratio may be used as the occupancy rate of the inhibiting layer. Similarly, the shape of the portion where the inhibiting layer does not exist may also be obtained in the same way.

In addition, the width of the particles of the inhibiting layer may be obtained by considering an overlapping section of the line and the inhibiting layer as the width of one inhibiting layer and obtaining the average of these widths, when a line is drawn in an SEM image having the same magnification.

In one implementation example of the present disclosure, the shape and occupancy rate of the inhibiting layer, the shape of the unformed portion of inhibiting layer, and the like may use values obtained at the center of the steel sheet in the width direction. However, it is not necessarily limited to this position, and for example, since spot weldability of the edge portion in the width direction may be a problem in more cases, the value obtained from the edge portion in the width direction may be used. Here, the edge portion in the width direction refers to both end points of a cross section obtained by cutting the steel sheet in the width direction, but when there is a problem with integrity of a specimen, such as the occurrence of contamination at the above points, it may mean a point inside 1 mm in the width direction from the end point.

The type of steel sheet targeted in the present disclosure is not limited as long as it is a high-strength steel sheet having strength of 780 MPa or more. However, it is not necessarily limited thereto, but the steel sheet targeted in the present disclosure may have a composition containing, by wt %, C: 0.05 to 1.5%, Si: 2.0% or less, Mn: 1.0 to 10%, S—Al (acid-soluble aluminum): 3% or less, Cr: 2.5% or less, Mo: 1% or less, B: 0.005% or less, Nb: 0.2% or less, Ti: 0.2% or less, V: 0.2% or less, Sb+Sn+Bi: 0.1% or less, N: 0.01% or less. The remaining components are iron and other impurities, and do not exclude components containing elements that are not listed above but may be further included in steel in the range of 1.0% or less in total. In the present disclosure, the content of each component element is represented based on weight unless otherwise specified. The above-described composition means the bulk composition of the steel sheet, that is, the composition at a ¼ point of the thickness of the steel sheet (hereinafter, the same).

However, in some implementation examples of the present disclosure, TRIP steel, DP steel, CP steel, and the like may be targeted as the high-strength steel sheet. Each steel may have the following composition.

Steel composition 1: C: 0.05 to 0.30% (preferably 0.10 to 0.25%), Si: 0.5 to 2.5% (preferably 1.0 to 1.8%), Mn: 1.5 to 4.0% (preferably 2.0 to 3.0%), S—Al: 1.0% or less, Cr: 2.0% or less (preferably 1.0% or less), Mo: 0.2% or less (preferably 0.1% or less), B: 0.005% or less (preferably 0.004% or less), Nb: 0.1% or less (preferably 0.05% or less), Ti: 0.1% or less (preferably 0.001 to 0.05%), Sb+Sn+Bi: 0.05% or less, N: 0.01% or less, balance Fe, and unavoidable impurities. In some cases, elements that are not listed above but may be included in the steel may be further included up to 1.0% or less in total.

Although not necessarily limited thereto, the steel having the steel composition 1 may include TRIP steel or XF steel, each of which may have a tensile strength of 900 MPa or more.

Steel composition 2: C: 0.05 to 0.30% (preferably 0.10 to 0.2%), Si: 0.5% or less (preferably 0.3% or less), Mn: 4.0 to 10.0% (preferably 5.0 to 9.0%), S—Al: 0.05% or less (preferably 0.001 to 0.04%), Cr: 2.0% or less (preferably 1.0% or less), Mo: 0.5% or less (preferably 0.1 to 0.35%), B: 0.005% or less (preferably 0.004% or less), Nb: 0.1% or less (preferably 0.05% or less), Ti: 0.15% or less (preferably 0.001 to 0.1%), Sb+Sn+Bi: 0.05% or less, N: 0.01% or less, balance Fe, and unavoidable impurities. In some cases, elements that are not listed above but may be included in the steel may be further included up to 1.0% or less in total.

Although not necessarily limited thereto, the steel having the steel composition 2 may include TRIP steel or XF steel, which may have a tensile strength of 1000 MPa or more.

According to one implementation example of the present disclosure, one or more plating layers may be included on the surface of the steel sheet, and the plating layer may be a zinc-based plating layer including galvanized (GI), zinc-magnesium (ZM), or the like. In the present disclosure, since the oxygen concentration of the surface layer is appropriately controlled as described above, even if the zinc-based plating layer is formed on the surface of the steel sheet, the problem of the liquid metal embrittlement occurring during the spot welding may be inhibited.

In addition, the plating adhesion amount of the zinc-based plating layer may be 30 to 70 g/m². When the plating adhesion amount is too small, it is difficult to obtain sufficient corrosion resistance. On the other hand, when the plating adhesion amount is too large, the problems of the increase in manufacturing costs and the liquid metal embrittlement problems may occur, and therefore, the plating adhesion amount is controlled to be within the above range. A more preferable range of the plating adhesion amount may be 40 to 60 g/m².

Hereinafter, one implementation example of manufacturing the steel sheet of the present disclosure will be described. However, it is necessary to note that the steel sheet of the present disclosure does not necessarily have to be manufactured by the following implementation examples, and the following implementation examples are one preferred method for manufacturing the steel sheet of the present disclosure.

First, a steel slab having the above composition may be reheated, hot rolled through rough rolling and finishing rolling, subjected to run out table (ROT) cooling, and then wound, to thereby manufacturing a hot rolled steel sheet.

Hot rolling conditions such as the ROT cooling are not particularly limited, but in one implementation example of the present disclosure, the slab reheating temperature, finishing rolling start and end temperature, and winding temperature may be limited as follows.

Slab Reheating Temperature: 950 to 1,300° C.

Slab reheating is performed to secure rollability by heating a material before hot rolling. During the slab reheating, the surface layer portion of the slab combines with oxygen in the furnace to form oxide scale. When the heating temperature is high enough, the composition of the surface layer portion of the steel sheet and the inner oxide may be controlled to be within an appropriate range through interaction with the process described later. However, conversely, when the heating temperature is too high, crystal grains grow excessively and the material of the steel sheet may deteriorate, so the slab is reheated in the above-described temperature range.

Finishing Rolling Start Temperature: 900 to 1,150° C.

When the finishing rolling start temperature is excessively high, the surface hot-rolled scale may be excessively developed and the amount of surface defects caused by the scale of the final product may increase, so the upper limit is limited to 1,150° C. In addition, when the finishing rolling start temperature is less than 900° C., the rigidity of a bar increases due to the decrease in temperature, so the hot rolling property may be greatly reduced, to thereby limit the finishing rolling start temperature to the above range.

Finishing Rolling End Temperature: 850 to 1,050° C.

When the finishing rolling end temperature exceeds 1,050° C., the scale removed by descaling during finishing rolling is excessively formed on the surface again, resulting in increasing the amount of surface defects, and when the finishing rolling end temperature is less than 850° C., the hot rolling property is reduced, to thereby limit the finishing rolling end temperature to the above range.

Winding Temperature: 590~750° C.

Then, the hot-rolled steel sheet is wound in the form of a coil and stored, and the wound steel sheet is subjected to an annealing process. Oxidizing elements included in the surface layer of the steel sheet are removed by this process. When the winding temperature of the hot-rolled steel sheet is too low, it is difficult to achieve sufficient effect because the coil is slowly cooled to a temperature lower than the temperature required to oxidize and remove these elements. In addition, when the winding temperature is too high, it may be difficult to secure materials such as the tensile strength of the steel sheet, and the plating quality such as plating adhesion may deteriorate due to the excessive development of internal oxidation of hot rolling.

Heating of edge portion of hot rolled coil: 5 to 24 hours at 600 to 800° C.

In one implementation embodiment of the present disclosure, the edge portion of the hot-rolled coil may be heated to increase an average value of the Mn/Si values of the oxides of the surface layer portion of the edge portion and lower an average value of the Mn/Si values of the internal oxides having a depth of 100 nm or more inside the steel sheet. Heating the edge portion of the hot-rolled coil means heating both end portions of the wound coil in the width direction, and by heating the edge portion, the edge portion is first heated to a temperature suitable for oxidation. That is, the inside of the wound coil is maintained at a high temperature, but the edge portion is cooled relatively quickly, so the time required to maintain the temperature suitable for the internal oxidation is shorter in the edge portion. Therefore, compared to the center portion in the width direction, the removal of the oxidizing elements in the edge portion is not active. The heating of the edge portion may be used as one method for removing oxidizing elements from an edge portion.

That is, when the heating of the edge portion is performed, unlike the case of cooling after winding, the edge portion is first heated, and thus the temperature of the edge portion in the width direction is maintained to be suitable for the internal oxidation, so the thickness of the inner oxide layer of the edge portion increases. To this end, the heating temperature of the edge portion needs to be 600° C. or higher (based on the temperature of the edge portion of the steel sheet). However, when the temperature is too high, since the tensile strength of the steel sheet decreases, and a scale is excessively formed on the edge portion during heating or a porous highly oxidized scale (hematite) is formed, the surface condition after pickling may deteriorate, so the temperature of the edge portion may be 800° C. or lower. A more preferable heating temperature of the edge portion is 600 to 750° C. According to one implementation example of the present disclosure, the heating of the edge portion may be performed in a heat treatment furnace.

In addition, in order to solve the unevenness between the average value of the Mn/Si values of the oxides of the surface layer portion between the edge portion in the width direction and the center portion generated during winding and the average values of the Mn/Si values of the internal oxide having a depth of 100 nm or more inside the steel sheet, the heating time of the edge portion needs to be 5 hours or more. However, when the heating time of the edge portion is too long, the tensile strength of the steel sheet decreases, the excessive scale is formed, or the average value of Mn/Si values of the oxides of the surface layer portion of the edge portion may be too high, or the average value of the Mn/Si values of the oxides inside the steel sheet may be too low. Therefore, the heating time of the edge portion may be 24 hours or less.

According to one implementation embodiment of the present disclosure, the heating of the edge portion may be performed by a combustion heating method through an air-fuel ratio control. That is, the oxygen fraction in the atmosphere may be changed by controlling the air-fuel ratio. When the oxygen partial pressure is high, high oxidizing hematite ($Fe_2O_3$) and Fayalite ($Fe_2SiO_4$), which is interfacial oxide, are excessively generated, which may reduce the plating surface quality, and when the oxygen partial pressure is low, it becomes disadvantageous in securing an appropriate heating temperature. Although not limited thereto, in one implementation embodiment of the present disclosure, the oxygen fraction may be controlled in a nitrogen atmosphere containing 1 to 2% of oxygen by controlling the air-fuel ratio. Since those skilled in the art may control the oxygen fraction by controlling the air-fuel ratio without any special difficulty, this will not be separately described.

Pickling Treatment: Perform at a Rolling Speed of 180 to 250 Mpm

In order to remove the scale of the hot-rolled steel sheet that has undergone the above-described process, the hot-rolled steel sheet is put in a hydrochloric acid bath and subjected to the pickling treatment. During pickling, the pickling treatment is performed in a hydrochloric acid concentration of the hydrochloric acid bath which is in the range of 10 to 30 vol %, and the pickling rolling speed is performed at 180 to 250 mpm. When the pickling speed exceeds 250 mpm, the surface scale of the hot-rolled steel sheet may not be completely removed, and when the pickling speed is lower than 180 mpm, the surface layer portion of the base iron may be corroded by hydrochloric acid, so the pickling treatment is performed at 180 mpm or more.

Cold Rolling Reduction Rate: 35 to 60%

After pickling, the cold rolling is performed. During cold rolling, the cold reduction rate is performed in the range of 35 to 60%. When the cold reduction rate is less than 35%, there is no particular problem, but it may be difficult to sufficiently control a microstructure due to insufficient recrystallization driving force during annealing. When the cold reduction rate exceeds 60%, it is difficult to have the average value of the appropriate Mn/Si value of the oxides of the surface layer portion after annealing and the average value of the Mn/Si values of the internal oxides having a depth of 100 nm or more inside the steel sheet.

After the above-described cold rolling process, a process of annealing the steel sheet may be followed. Even during the annealing process of the steel sheet, since the average value of the Mn/Si values of the oxide of the surface layer of the steel sheet and the average value of the Mn/Si values of the internal oxide having a depth of 100 nm or more inside the steel sheet may vary greatly, in one implementation embodiment of the present disclosure, the annealing process may be controlled under the conditions in which the average value of the Mn/Si values of the oxides of the surface layer portion and the average value of the Mn/Si values of the internal oxides at a depth of 100 nm or more inside the steel sheet is controlled. Among those, the rolling speed and the dew point in the annealing furnace may be controlled under the following conditions.

Rolling Speed During Annealing: 40 to 130 Mpm

In order to secure sufficient productivity, the rolling speed of the cold-rolled steel sheet needs to be 40 mpm or more. However, when the rolling speed is excessively fast, it may be disadvantageous in terms of securing the material, so, in one implementation embodiment of the present disclosure, the upper limit of the rolling speed may be set to 130 mpm.

Soaking Zone Temperature and Dew Point Control of Annealing Furnace: Controlled in the Range of −10 to 30° C. At 650 to 900° C.

It is advantageous to control the dew point in the soaking zone of the annealing furnace in order to control the Mn/Si ratio of the oxides in the inside and the surface layer portion to be within an appropriate range. When the dew point is too low, there is a possibility that oxides such as Si or Mn may be formed on the surface due to the surface oxidation rather than the internal oxidation. These oxides adversely affect plating. Therefore, the dew point needs to be controlled to be −10° C. or higher. Conversely, when the dew point is too high, the oxidation of Fe may occur, so the dew point needs to be controlled to be 30° C. or lower. As such, the temperature for controlling the dew point may be 650° C. or higher, which is a temperature at which a sufficient internal oxidation effect appears. However, when the temperature is too high, surface oxides such as Si are formed to prevent oxygen from diffusing into the inside, and austenite is excessively generated during the heating of the soaking zone to lower the carbon diffusion rate, resulting in lowering the internal oxidation level, and the soaking zone austenite size grows excessively, resulting in material softening. In addition, since the load of the annealing furnace may be generated to shorten the life of the equipment and increasing the process cost, the temperature for controlling the dew point may be 900° C. or less.

In this case, the dew point may be controlled by introducing moist nitrogen ($N_2$+$H_2O$) containing water vapor into the annealing furnace.

Hydrogen Concentration in Soaking Zone: 5 to 10 Vol %

The atmosphere in the annealing furnace maintains a reducing atmosphere by adding 5 to 10 vol % hydrogen to nitrogen gas. When the hydrogen concentration in the annealing furnace is less than 5 vol %, the surface oxides are excessively formed due to the decrease in reducing ability, resulting in poor surface quality and plating adhesion and low resistance to LME. When the hydrogen concentration is high, no special problem occurs, but since the cost increases due to the increase in the amount of hydrogen gas used and there is a risk of explosion in the furnace due to the increase in hydrogen concentration, the hydrogen concentration needs to be limited.

Inlet Temperature of Plating Bath Steel Sheet: 420 to 500° C.

When the inlet temperature of the steel sheet in the plating bath is low, the wettability in the contact interface between the steel sheet and liquid zinc is not sufficiently assured, so it needs to be kept above 420° C. There is a problem in that, when the inlet temperature is excessively high, the reaction between the steel sheet and the liquid zinc is excessive, and thus a zetta phase, which is an Fe—Zn alloy phase occurs at the interface, resulting in lowering the adhesion of the plating layer, and dross occurs in the plating bath due to excessive elution of steel sheet Fe element in the plating bath.

The Al concentration in the plating bath needs to be maintained at an appropriate concentration to secure the wettability of the plating layer and the fluidity of the plating bath. In the case of GI, it needs to be controlled 0.2 to 0.25%, and in the case of ZM, Al needs to be controlled to be 0.7 to 13.2 wt % and Mg needs to be controlled to be 0.7 to 5.7 wt % so that they are maintained at an appropriate level, so the formation of dross in the plating bath may be maintained at an appropriate level, and the plating surface quality and performance may be secured. In the present disclosure, the plating adhesion amount is not particularly limited and may be appropriately controlled according to the quality required by a customer.

MODE FOR INVENTION

Hereinafter, the present disclosure will be described in more detail with reference to Examples. However, it should be noted that the following Examples are only for illustrating the present disclosure in more detail and are not intended to limit the scope of the present disclosure. This is because the scope of the present disclosure is determined by the matters described in the claims and the matters reasonably inferred therefrom.

Example

A steel slab (the remaining components not listed in the table are Fe and unavoidably included impurities. In addition, in the table, B and N are expressed in ppm units, and the remaining components are expressed in weight % units) having a composition shown in Table 1 below was reheated to 1,213° C., hot-rolled by setting a finishing rolling start temperature and a finishing rolling end temperature to 1,117° C. and 972° C., respectively. Next, an edge portion of the hot-rolled coil was heated for 8 hours in a nitrogen atmosphere with 1.5 vol % or less of oxygen and then rolled at 180 mpm in a hydrochloric acid bath with an average hydrochloric acid concentration of 15 vol %, pickled, and cold-rolled. Then, the obtained cold-rolled steel sheet was annealed in a soaking zone in an annealing furnace in a hydrogen concentration of 8 vol % and the remaining nitrogen gas atmosphere. After the annealing, GI was dipped in a plating bath containing 0.24 wt % of Al, ZM was dipped in a zinc-based plating bath containing 1.75 wt % of Al and 1.55 wt % of Mg, hot-dip galvanizing was performed, an adhesion amount was controlled by air wiping, and cooling was performed, to thereby obtain hot-dipped galvanized steel sheet.

In all examples, the inlet temperature of the steel sheet drawn into the hot-dip galvanizing bath was set to 475° C. Other conditions for each Example were as described in Table 2.

TABLE 1

| Steel Type | C | Si | Mn | S—Al | Cr | Mo | B | Nb | Ti | Sb | Sn | Bi |
|---|---|---|---|---|---|---|---|---|---|---|---|---|
| A | 0.245 | 0.245 | 7.214 | 0.0027 | 0 | 0 | 15 | 0.017 | 0.019 | 0 | 0 | 0 |
| B | 0.212 | 1.548 | 2.225 | 0.0052 | 0 | 0.0024 | 17 | 0.024 | 0.014 | 0 | 0.0045 | 0 |
| C | 0.214 | 0.02 | 6.875 | 0.0025 | 0 | 0 | 11 | 0 | 0.054 | 0 | 0 | 0 |
| D | 0.147 | 0.04 | 15.57 | 0.0026 | 0 | 0 | 21 | 0.0021 | 0.045 | 0.024 | 0 | 0 |
| E | 0.175 | 1.542 | 2.685 | 0.0054 | 0.457 | 0.0475 | 11 | 0.05 | 0.032 | 0 | 0 | 0.01 |
| F | 0.156 | 2.954 | 2.654 | 0.0034 | 0.447 | 0.017 | 17 | 0.0045 | 0.021 | 0 | 0 | 0 |
| G | 0.195 | 1.425 | 2.654 | 0.0024 | 0.354 | 0.0021 | 14 | 0 | 0.021 | 0.011 | 0 | 0 |

TABLE 2

| Steel type | Division | Hot rolled winding temperature (° C.) | Heating temperature of edge portion (° C.) | Cold rolling reduction rate (%) | Annealing rolling speed (mpm) | Soaking zone temperature (° C.) | Dew point of 650 to 900° C. (° C.) |
|---|---|---|---|---|---|---|---|
| D | Comparative Example 1 | 621 | 650 | 49 | 91 | 847 | 9 |
| C | Inventive Example 1 | 651 | 673 | 52 | 76 | 851 | 7 |
| G | Comparative Example 2 | 624 | 732 | 51 | 84 | 817 | 37 |
| C | Comparative Example 3 | 634 | 633 | 41 | 142 | 748 | 5 |
| A | Inventive Example 2 | 601 | 631 | 52 | 82 | 824 | 8 |
| B | Comparative Example 4 | 654 | 631 | 53 | 96 | 810 | −14 |
| G | Comparative Example 5 | 617 | 683 | 41 | 37 | 765 | −7 |
| E | Inventive Example 3 | 685 | 621 | 48 | 84 | 865 | 26 |
| E | Comparative Example 6 | 504 | 731 | 57 | 117 | 784 | 14 |
| E | Inventive Example 4 | 632 | 713 | 45 | 62 | 784 | 15 |
| G | Comparative Example 7 | 634 | 698 | 49 | 151 | 805 | 21 |
| A | Inventive Example 5 | 651 | 631 | 44 | 67 | 824 | 17 |
| F | Comparative Example 8 | 617 | 698 | 52 | 105 | 827 | 10 |
| B | Inventive Example 6 | 695 | 608 | 45 | 72 | 841 | 6 |
| A | Comparative Example 9 | 617 | 632 | 75 | 123 | 762 | 20 |
| C | Comparative Example 10 | 634 | 668 | 52 | 74 | 621 | 14 |
| G | Inventive Example 7 | 612 | 701 | 46 | 54 | 754 | 21 |
| G | Inventive Example 8 | 647 | 739 | 51 | 81 | 824 | 5 |
| B | Comparative Example 11 | 776 | 619 | 51 | 127 | 795 | 12 |
| A | Comparative Example 12 | 624 | 682 | 40 | 105 | 917 | −4 |
| C | Comparative Example 13 | 615 | 865 | 47 | 75 | 795 | 4 |
| B | Comparative Example 14 | 621 | 532 | 45 | 72 | 842 | 7 |

The characteristics of the hot-dipped galvanized steel sheet manufactured by the above-described process were measured, and the results of observing whether liquid metal embrittlement (LME) occurred during spot welding were shown in Table 3. The test results shown in Table 3 are all measured using samples taken at a point 1 mm away from the edge portion of the steel sheet unless the position is specifically mentioned. When the size of the sample is large, a sample with a predetermined dimension was measured with the point 1 mm away from the edge portion as a starting point. Specifically, the spot welding was performed by cutting the steel sheet in a width direction along each cut edge. A spot welding current was applied twice and a hold time of 1 cycle was maintained after a current was applied. The spot welding was performed in dissimilar 3 sheets. Evaluation material-evaluation material-GA 980DP 1.4t material were stacked in order and subjected to the spot welding. After a new electrode is welded to a soft material 15 times during the spot welding, the electrode is worn, and then the upper limit current at which expulsion occurs with the spot welding target material was measured. After measuring the upper limit current, the spot welding was performed 8 times for each welding current at a current lower than the upper limit current by 0.5 and 1.0 kA, and a cross section of the spot welded portion was precisely processed by electric discharge machining, and epoxy mounted and polished, and a length of cracks was measured with an optical microscope. When observing with the optical microscope, the magnification was set to 100, and if no cracks were found at that magnification, it was determined that the liquid metal embrittlement had not occurred, and if cracks were found, the length was measured with image analysis software. B-type cracks occurring at a shoulder portion of the spot welded portion were determined to be 100 μm or less and C-type cracks were determined to be good when not observed.

For the ratio at which the inhibiting layer (IL) under the plating layer (mainly made of Zn-eta phase) applies the surface of the steel sheet, after the plating layer was dissolved with a dichromic acid solution ($CrO_3+HNO_3+ZnSO_4+H_2O$) and the surface of the plating layer was neutralized and washed and cleaned, in the photograph of three or more Al distributions analyzed at 500 times EPMA magnification, an area with an Al concentration of 10% or more compared to the highest concentration (CPS standard) is an area where the inhibiting layer exists, and the ratio of the area was calculated with image analysis software to derive an average value of area %, and when the average value was 60 area % or more, it was determined to be good. A size of the non-forming portion of the inhibiting layer was also classified in the same way. In all of the following examples, there was no non-forming portion of the inhibiting layer having a size of 15 μm, and in all the examples, it was confirmed that an average width of particles constituting the inhibiting layer corresponds to the range of 0.5 to 4 μm.

Tensile strength was measured through a tensile test by making a C-direction sample of the JIS-5 standard. The plating adhesion amount was measured using a wet dissolution method using a hydrochloric acid solution.

For sealer adhesion, an automotive structural adhesive D-type was bonded to a plating surface and then the steel sheet was bent at 90° to confirm whether the plating was removed.

The surface quality was confirmed by visually checking whether there were any defects such as the unplating of the steel sheet, and when defects such as the unplating were observed with the naked eye, the steel sheet was determined to be defective.

TABLE 3

| Division | Inhibiting layer application area ratio (%) | Tensile strength (MPa) | Type of plating | Plating adhesion amount (g/m²) | Surface quality | Sealer adhesion | LME occurrence B-type (μm) | LME occurrence C-type (μm) |
|---|---|---|---|---|---|---|---|---|
| Comparative Example 1 | 43 | 1,192 | GI | 62 | Bad | Peeling | 32 | 231 |
| Inventive Example 1 | 65 | 1,204 | GI | 51 | Good | Good | 54 | ND |
| Comparative Example 2 | 63 | 684 | GI | 61 | Good | Good | 12 | ND |
| Comparative Example 3 | 32 | 1,203 | GI | 53 | Good | Good | 203 | 232 |
| Inventive Example 2 | 78 | 1,223 | GI | 50 | Good | Good | 42 | ND |
| Comparative Example 4 | 23 | 1,034 | GI | 58 | Bad | Bad | 154 | 543 |
| Comparative Example 5 | 74 | 765 | GI | 49 | Good | Good | 12 | ND |
| Inventive Example 3 | 81 | 1,189 | GI | 43 | Good | Good | 15 | ND |
| Comparative Example 6 | 45 | 1,201 | GI | 59 | Good | Good | 234 | 543 |
| Inventive Example 4 | 73 | 1,224 | GI | 58 | Good | Good | 32 | ND |
| Comparative Example 7 | 43 | 1,198 | ZM | 48 | Good | Good | 32 | 143 |
| Inventive Example 5 | 61 | 1,203 | GI | 53 | Good | Good | 12 | ND |
| Comparative Example 8 | 43 | 1,214 | GI | 51 | Bad | Peeling | 189 | 123 |
| Inventive Example 6 | 65 | 1,192 | GI | 60 | Good | Good | 32 | ND |

TABLE 3-continued

| Division | Inhibiting layer application area ratio (%) | Tensile strength (MPa) | Type of plating | Plating adhesion amount (g/m²) | Surface quality | Sealer adhesion | LME occurrence B-type (μm) | C-type (μm) |
|---|---|---|---|---|---|---|---|---|
| Comparative Example 9 | 23 | 1,201 | GI | 48 | Good | Good | 51 | 764 |
| Comparative Example 10 | 35 | 775 | GI | 47 | Good | Good | 34 | 633 |
| Inventive Example 7 | 78 | 1,201 | ZM | 43 | Good | Good | 11 | ND |
| Inventive Example 8 | 71 | 1,203 | GI | 43 | Good | Good | 54 | ND |
| Comparative Example 11 | 32 | 754 | GI | 49 | Bad | Bad | 35 | ND |
| Comparative Example 12 | 56 | 772 | GI | 44 | Good | Good | 21 | ND |
| Comparative Example 13 | 35 | 774 | GI | 53 | Bad | Bad | 152 | 318 |
| Comparative Example 14 | 48 | 1,021 | GI | 43 | Bad | Bad | 231 | 439 |

Inventive examples 1, 2, 3, 4, 5, 6, 7, and 8 satisfied the range suggested in the present disclosure for steel composition, and the manufacturing method also satisfied the range of the present disclosure, so the tensile strength, the plating quality, the plating adhesion amount, and the spot welding LME crack length were also good.

In Comparative Examples 1 and 8, even though the manufacturing method satisfies the range suggested by the present disclosure, the steel component exceeded the range suggested by the present disclosure. In Comparative Examples 1 and 8, Mn and Si exceeded the range suggested by the present disclosure, respectively, and the area ratio of the inhibiting layer with which the steel sheet is applied did not satisfy the criterion when the dew point in the annealing furnace was raised. Formation of surface oxides was also excessive during annealing due to the excessive Si and Mn content. Accordingly, a sufficient decarburization layer was not formed, and an alloying inhibiting layer was not sufficiently formed at an interface between the plating layer and the base iron, so the LME cracks did not satisfy the criterion, and unplating occurred on the surface, resulting in poor surface quality and SBT peeling, so plating adhesion was not good.

In Comparative Examples 6 and 11, the winding temperature during the hot rolling process did not satisfy the range suggested by the present disclosure. In Comparative Example 6, the hot rolled winding temperature was lower than the range suggested by the present disclosure, and thus, the amount of internal oxidation generated by hot rolling was not sufficient, so the area ratio of the inhibiting layer with which the steel sheet is applied was less than 60 area ratio %, so the LME cracks did not satisfy the criterion. Comparative Example 11 was produced in excess of the hot rolled winding temperature suggested by the present disclosure, and the internal oxidation amount generated during the hot rolling process was sufficient, so the LME characteristics were good, but the hot rolled scale was excessively generated and thus the scale could not be completely removed during pickling to cause the unplating, so the surface quality was poor, and the hot-rolled winding temperature was excessively high, so the softening of the hot-rolled material occurred and did not recover after annealing, resulting in poor material.

In Comparative Examples 13 and 14, the heat treatment temperature during the edge heat treatment process did not satisfy the range suggested by the present disclosure. In Comparative Example 13, the heat treatment temperature exceeds the range suggested by the present disclosure and thus excessive interfacial scale and highly oxidative scale are formed on the edge portion, so the scale was not completely removed after pickling and remained in the form of Si-based oxide, resulting in poor surface quality, and the edge portion were excessively heated and thus the softening occurred, so the tensile strength was not satisfied. In addition, the surface reaction was not active in a high dew point atmosphere due to the Si-based oxide, so the LME resistance did not meet the criterion. In Comparative Example 14, since the heating temperature of the edge portion was lower than the range suggested by the present disclosure, the inner oxide layer could not be sufficiently formed and thus the sufficient inhibiting layer could not be formed during the plating process, so the plating surface quality and sealer adhesion were poor and the LME resistance was not satisfied.

Comparative Example 4 was a case where the dew point in the furnace during annealing was lower than the range suggested by the present disclosure. Even if the internal oxide layer sufficient for the entire width was generated during the hot rolling and heating process, the dew point was not sufficiently high during the annealing process after cold rolling and thus the internal oxidation was not sufficiently formed, so the area ratio of the inhibiting layer with which the steel sheet is applied was less than 60 area %, and the sufficient level of decarburization was not formed, so the spot welding LME crack length was poor. The GI material did not generate sufficient internal oxidation due to its low dew point, so surface oxides were excessively generated, resulting in poor surface quality.

In Comparative Example 2, the dew point range in the annealing furnace exceeded the range suggested by the present disclosure. As the dew point became excessively high, the internal oxidation occurred sufficiently and the LME was satisfied, but the material deteriorated due to the excessive internal oxidation and did not satisfy the criterion.

Comparative Examples 3 and 7 are cases in which the rolling speed of the steel sheet in annealing is produced under conditions higher than the range suggested by the present disclosure. Sufficient time is not given for the decarburization reaction in which water vapor in the annealing furnace reacts with the steel sheet and thus the internal oxidation of the surface layer of the steel sheet after annealing is not sufficiently formed, so the area ratio of the inhibiting layer with which the steel sheet is applied was less than 60 area ratio % and the spot welding LME cracks exceeded the criterion when evaluating, resulting in poor results.

In Comparative Example 12, the soaking zone temperature in the annealing furnace exceeded the range suggested by the present disclosure. As the annealing temperature became excessive, the external oxidation amount increased and the sufficient internal oxidation amount was not formed, so the area ratio of the inhibiting layer with which the steel sheet is applied was less than 60 area ratio %, and the LME cracks did not meet the criterion, resulting in poor spot weldability. In addition, austenite was excessively formed and grown in the soaking zone, and the material did not satisfy the criterion, resulting in poor results.

Comparative Example 10 is a case where the soaking zone temperature in the annealing furnace was lower than the range suggested by the present disclosure. The oxidation reaction between the water vapor and the steel sheet was not sufficient due to the low annealing temperature and thus the internal oxidation was not sufficiently formed, so the area ratio of the inhibiting layer with which the steel sheet is applied was less than 60 area ratio % and the LME crack did not meet the criterion, resulting lowering the spot weldability. In addition, since recrystallization was not sufficiently performed during annealing, a targeted microstructure was not formed, and the material did not satisfy the criterion, resulting in poor results.

Comparative Example 5 is a case where the rolling speed of the steel sheet in annealing was lower than the range suggested by the present disclosure. Although the internal oxide layer was sufficiently formed by securing sufficient reaction time with the water vapor in the annealing furnace, the material did not satisfy the criterion due to excessive crystal grain growth.

Comparative Example 9 was prepared with a cold reduction rate exceeding the criterions suggested by the present disclosure. The internal oxidation layer formed during hot rolling was thinned due to excessive cold rolling and thus the amount of internal oxidation was not sufficient, so the area ratio of the inhibiting layer with which the steel sheet is applied was less than 60 area ratio % and the LME cracks did not satisfy the criterion, resulting in poor results.

Therefore, it was possible to confirm the advantageous effect of the present disclosure.

The invention claimed is:

1. A hot-dipped galvanized steel sheet, comprising:
   a base steel sheet; and
   a hot-dipped galvanized layer formed on a surface of the base steel sheet,
   wherein an inhibiting layer made of a Fe—Al alloy is formed at an area ratio of 60% or more between the base steel sheet and the hot-dipped galvanized layer,
   wherein an average width of particles constituting the inhibiting layer is 4 μm or less, and
   wherein, the average width of the particle means that, when a straight line is drawn in one direction in a photograph of the inhibiting layer viewed from above, a length of a line segment overlapping the particle is determined as a width of the particle, and the average is obtained.

2. The hot-dipped galvanized steel sheet of claim 1, wherein the inhibiting layer is formed at an area ratio of 70% or more.

3. The hot-dipped galvanized steel sheet of claim 1, wherein an average width of particles constituting the inhibiting layer is 0.5 μm or more.

4. The hot-dipped galvanized steel sheet of claim 1, wherein an average equivalent circle diameter of a portion where the inhibiting layer is not formed is 15 μm or less.

5. The hot-dipped galvanized steel sheet of claim 1, wherein the base steel sheet has a composition containing C: 0.05 to 1.5 wt %, Si: 2.0 wt % or less, Mn: 1.0 to 10 wt %, S—Al (acid-soluble aluminum): 3 wt % or less, Cr: 2.5 wt % or less, Mo: 1 wt % or less, B: 0.005 wt % or less, Nb: 0.2 wt % or less, Ti: 0.2 wt % or less, V: 0.2 wt % or less, Sb+Sn+Bi: 0.1 wt % or less, N: 0.01 wt % or less.

* * * * *